(12) United States Patent
Mansour et al.

(10) Patent No.: US 12,598,009 B2
(45) Date of Patent: Apr. 7, 2026

(54) DYNAMIC USER EQUIPMENT ANTENNA TRANSMISSION PROFILE SWITCHING

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 345 days.

(21) Appl. No.: 18/504,950

(22) Filed: Nov. 8, 2023

(65) Prior Publication Data

US 2025/0150179 A1     May 8, 2025

(51) Int. Cl.
| | |
|---|---|
| *H04B 17/336* | (2015.01) |
| *H04B 7/0404* | (2017.01) |
| *H04W 24/02* | (2009.01) |
| *H04W 24/08* | (2009.01) |

(52) U.S. Cl.
CPC ......... *H04B 17/336* (2015.01); *H04B 7/0404* (2013.01); *H04W 24/02* (2013.01); *H04W 24/08* (2013.01)

(58) Field of Classification Search
CPC .............................. H04B 17/336; H04W 24/08
See application file for complete search history.

(56) References Cited

U.S. PATENT DOCUMENTS

| | | | | |
|---|---|---|---|---|
| 2006/0286941 A1* | 12/2006 | Behroozi | ............. | H04B 7/0802 |
| | | | | 455/78 |
| 2007/0010202 A1* | 1/2007 | Yamamoto | ........... | H04B 7/0848 |
| | | | | 455/63.1 |
| 2009/0156227 A1* | 6/2009 | Frerking | .............. | H04B 7/0413 |
| | | | | 455/455 |
| 2010/0203916 A1 | 8/2010 | Tiwari et al. | | |
| 2014/0086071 A1 | 3/2014 | Hu et al. | | |
| 2015/0065188 A1 | 3/2015 | Nukala et al. | | |
| 2016/0248496 A1* | 8/2016 | Bellamkonda | ....... | H04B 7/0413 |
| 2017/0012722 A1* | 1/2017 | Nilsson | .................... | H04B 7/10 |
| 2023/0239019 A1 | 7/2023 | Chisu et al. | | |
| 2023/0318176 A1* | 10/2023 | van Erven | ........... | H04B 7/0691 |
| | | | | 343/702 |

FOREIGN PATENT DOCUMENTS

| | | |
|---|---|---|
| WO | 2023/023921 A1 | 3/2023 |

OTHER PUBLICATIONS

International Search Report and Written Opinion received for PCT Patent Application No. PCT/US2024/055064, mailed on Jan. 22, 2025, 14 pages.

* cited by examiner

*Primary Examiner* — Zhiren Qin
(74) *Attorney, Agent, or Firm* — SHOOK, HARDY & BACON L.L.P.

(57)     ABSTRACT

Embodiments of the present disclosure are focused on systems and methods for enhanced management of transmission profiles within a communication network. The disclosure includes the continuous monitoring of signal to interference plus noise ratios (SINR) and throughput for the UE operating within the coverage area of the base station. Upon the detection that the SINR falls below or surpasses a dynamically adjustable pre-determined threshold, the transmission profile of the UE is dynamically adjusted. The UE can switch between a two-antenna transmission profile and a four-antenna transmission profile, depending on the SINR, ensuring optimized communication within the network.

20 Claims, 6 Drawing Sheets

400

402
DETERMINE THAT A FIRST USER EQUIPMENT (UE) IS CONFIGURED TO OPERATE WITHIN A COVERAGE AREA OF A BASE STATION USING TWO TRANSMISSION ANTENNAS

404
MONITOR, A SIGNAL TO INTERFERENCE PLUS NOISE RATIO (SINR) AND A THROUGHPUT FOR THE FIRST UE

406
DETERMINE, THAT THE SINR FALLS BELOW A PREDETERMINED THRESHOLD

408
BASED ON THE SINR FALLING BELOW THE PREDETERMINED THRESHOLD, CONFIGURE THE FIRST UE TO OPERATE WITHIN THE COVERAGE AREA OF THE BASE STATION USING FOUR ANTENNAS

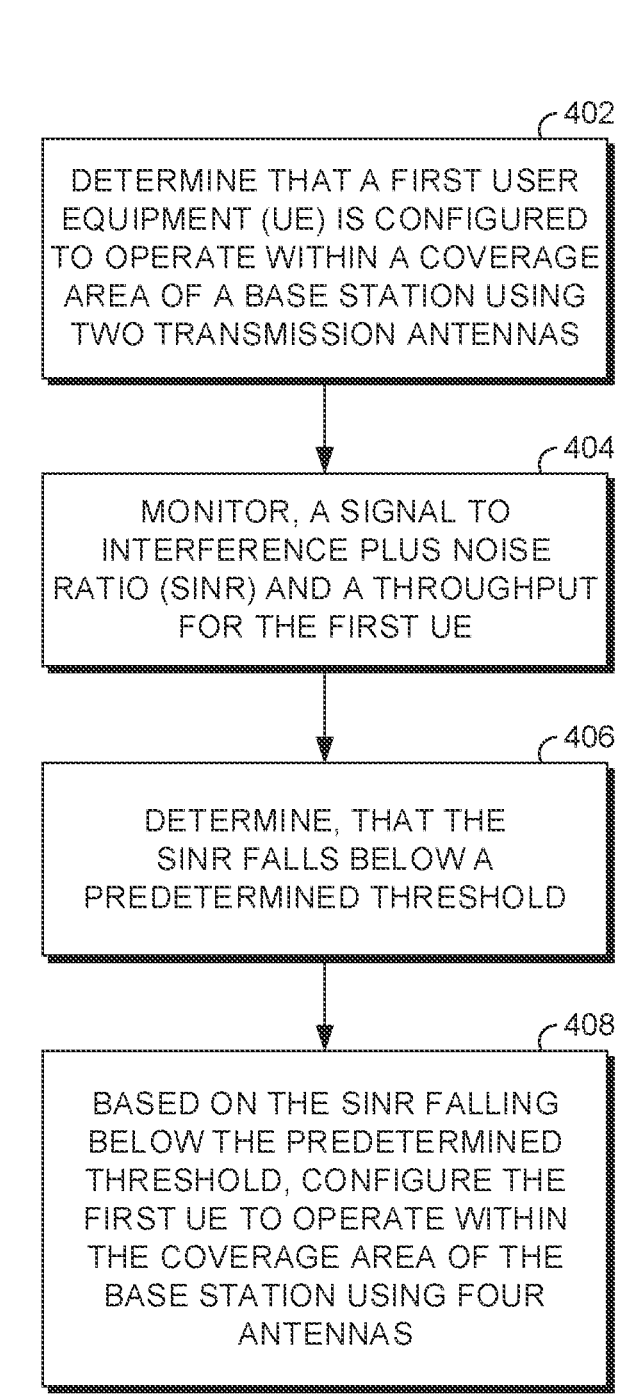

400

402

DETERMINE THAT A FIRST USER EQUIPMENT (UE) IS CONFIGURED TO OPERATE WITHIN A COVERAGE AREA OF A BASE STATION USING TWO TRANSMISSION ANTENNAS

404

MONITOR, A SIGNAL TO INTERFERENCE PLUS NOISE RATIO (SINR) AND A THROUGHPUT FOR THE FIRST UE

406

DETERMINE, THAT THE SINR FALLS BELOW A PREDETERMINED THRESHOLD

408

BASED ON THE SINR FALLING BELOW THE PREDETERMINED THRESHOLD, CONFIGURE THE FIRST UE TO OPERATE WITHIN THE COVERAGE AREA OF THE BASE STATION USING FOUR ANTENNAS

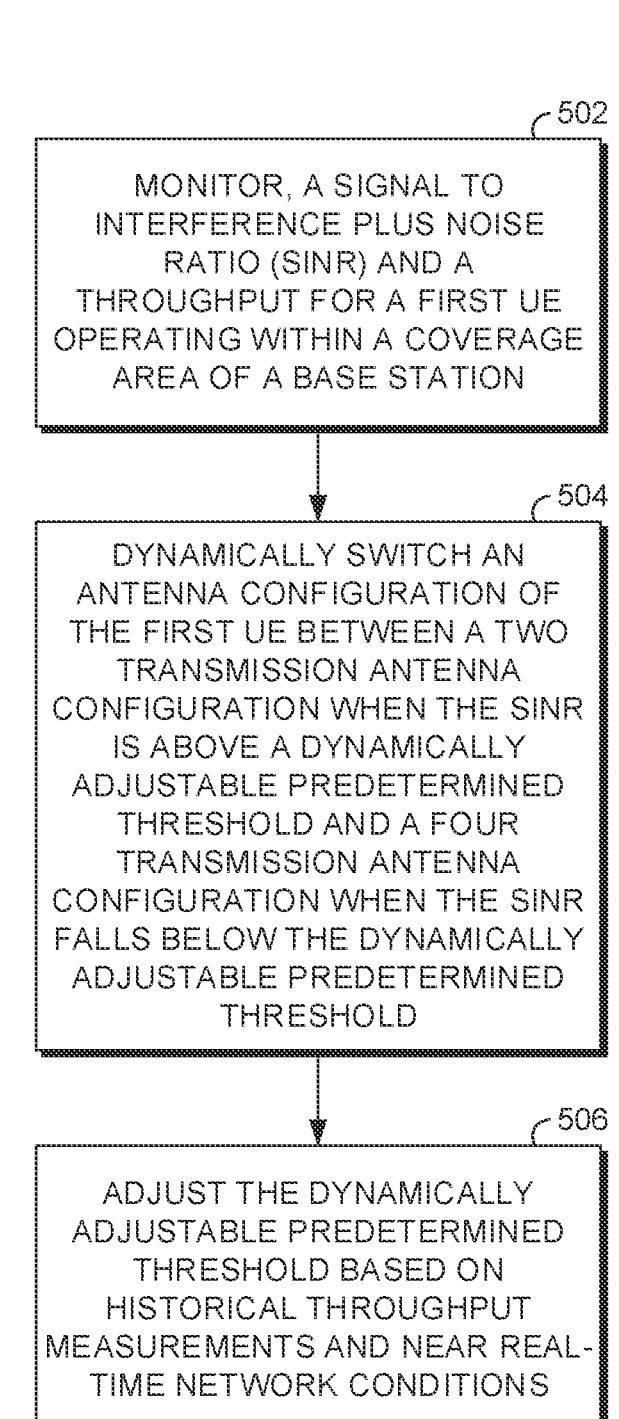

502

MONITOR, A SIGNAL TO INTERFERENCE PLUS NOISE RATIO (SINR) AND A THROUGHPUT FOR A FIRST UE OPERATING WITHIN A COVERAGE AREA OF A BASE STATION

504

DYNAMICALLY SWITCH AN ANTENNA CONFIGURATION OF THE FIRST UE BETWEEN A TWO TRANSMISSION ANTENNA CONFIGURATION WHEN THE SINR IS ABOVE A DYNAMICALLY ADJUSTABLE PREDETERMINED THRESHOLD AND A FOUR TRANSMISSION ANTENNA CONFIGURATION WHEN THE SINR FALLS BELOW THE DYNAMICALLY ADJUSTABLE PREDETERMINED THRESHOLD

506

ADJUST THE DYNAMICALLY ADJUSTABLE PREDETERMINED THRESHOLD BASED ON HISTORICAL THROUGHPUT MEASUREMENTS AND NEAR REAL-TIME NETWORK CONDITIONS

FIG. 5.

DYNAMIC USER EQUIPMENT ANTENNA TRANSMISSION PROFILE SWITCHING

SUMMARY

The present disclosure pertains to enhancing methodologies for optimizing antenna profile switching within a communication network, substantially as exemplified in conjunction with at least one of the Figures, and as articulated more comprehensively in the claims.

In various technological embodiments, a base station facilitates communication by interacting with user equipment (UE) within its coverage area. The base station and the UE can face communication inefficiencies or disruptions due to fluctuating signal to interference plus noise ratios (SINR) and changing network conditions. Under such circumstances, a dynamic approach to transmission profile may be beneficial. When the SINR either surpasses a pre-determined threshold or falls below it, the system can dynamically alter the UE's transmission profile, toggling between two and four antenna transmission profiles. This adaptive mechanism draws on real-time SINR and throughput data, combined with historical network performance measurements. As a result, it enables prompt adjustments to the transmission profiles, ensuring the maintenance of high communication quality.

This summary is intended to introduce a range of concepts in a simplified form that are further elaborated upon in the detailed description below. It is not meant to identify key or critical elements of the claimed subject matter, nor is it to be utilized as a solitary reference in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein:

FIG. 4 depicts a flow diagram of an exemplary method for optimizing antenna switching, in accordance with embodiments described herein; and FIG. 5 depicts a flow diagram of an exemplary method for optimizing antenna switching, in accordance with embodiments described herein.

DETAILED DESCRIPTION

Figure 1:
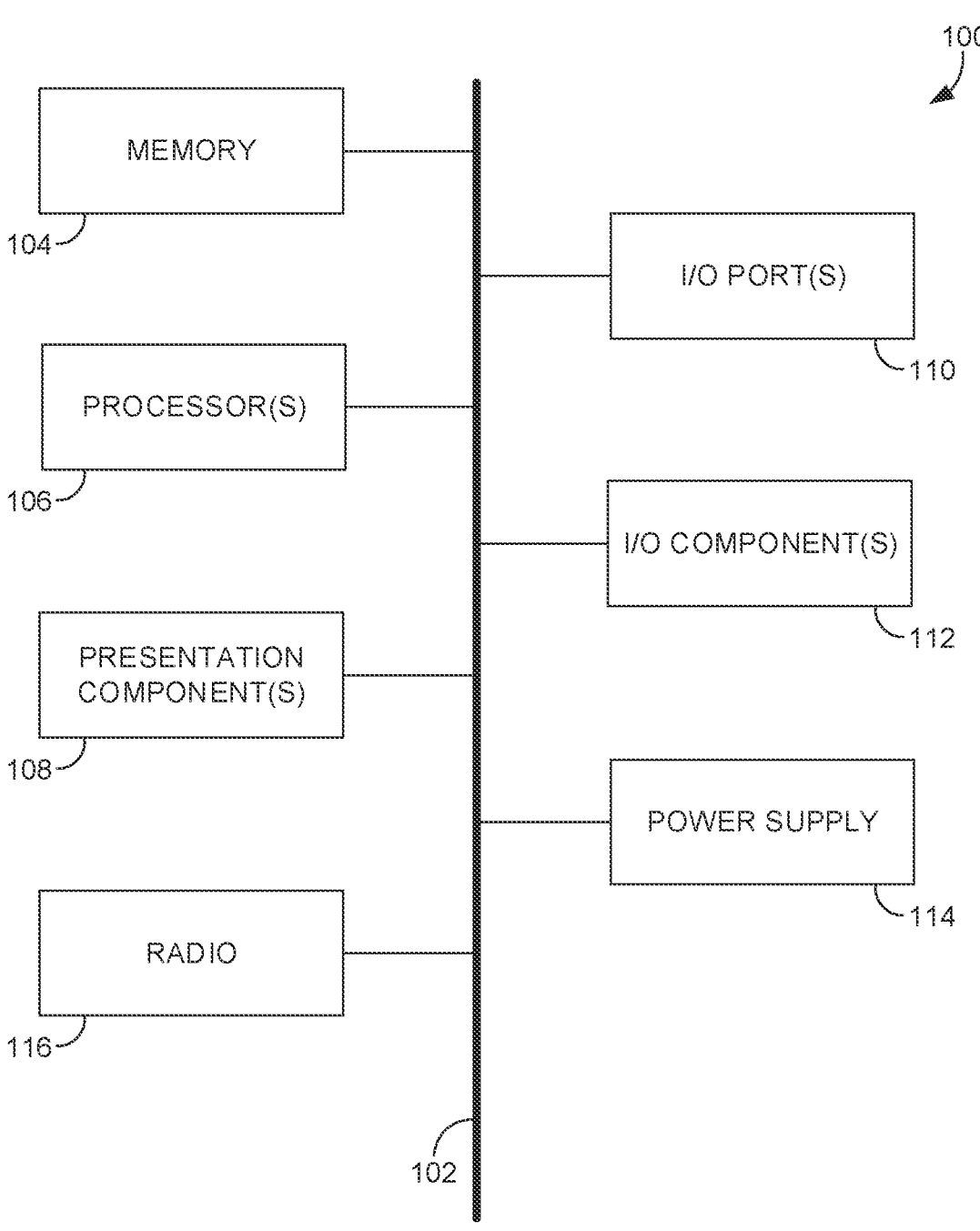
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to an access point that transmits signals to a UE and receives signals from the UE in order to allow the UE to connect to a broader data or cellular network (including by way of one or more intermediary networks, gateways, or the like)

Embodiments of the technology described herein may be embodied as, among other things, a method, system, or computer-program product. Accordingly, the embodiments may take the form of a hardware-based embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In the rapidly evolving landscape of wireless communication, the demand for reliable and efficient connectivity has never been higher. With the advent of 5G technology and the Internet of Things (IoT), a multitude of devices are continuously interacting within an intricate web of communication. However, the current systems face challenges in terms of signal interference and noise, which can significantly impact the quality of service. A key metric in assessing the performance of these systems is the SINR, which quantifies the quality of a signal in the presence of interference and noise.

The existing communication infrastructures primarily rely on static transmission profiles, which may not be optimally arranged when network conditions change. While these systems can offer a degree of reliability, their static nature hinders their ability to optimize performance in real-time. This limitation can result in decreased throughput and compromised signal quality, especially in densely populated areas or challenging terrains where interference is prevalent.

Unlike conventional solutions, the present disclosure is directed to intelligently monitoring SINR and throughput and adjusting UE transmission profiles in response to changes in these parameters. In some embodiments a system continuously monitors SINR and throughput for a UE operating within the coverage area of a base station. Upon the detection that the SINR falls below a dynamically adjustable pre-determined threshold, the transmission profile of the UE is dynamically adjusted. The UE can switch between a two-antenna transmission profile and a four-antenna transmission profile, depending on the SINR, ensuring optimized communication within the network Accordingly, a first aspect of the present disclosure is directed to a method for dynamic optimization of antenna switching, focused on maintaining efficient communication in fluctuating network environments. This method entails determining that a UE is configured to operate within a coverage area of a base station using a two-antenna transmission profile. SINR and throughput for the UE are monitored. If the SINR falls below a pre-determined threshold, the method involves configuring the UE to operate within the coverage area of the base station using a four-antenna transmission profile.

A second aspect of the present disclosure delves into a refined method for dynamic optimization of antenna switching. This method includes monitoring SINR and throughput for a UE operating within a coverage area of a base station. The transmission profile of the UE is dynamically switched between a two-antenna transmission profile when the SINR is above a dynamically adjustable pre-determined threshold, and a four-antenna transmission profile when the SINR falls below this threshold. Further, this threshold is adjustable based on historical throughput measurements and near real-time network conditions.

Another aspect of this disclosure is directed towards an evolved method for dynamic optimization of antenna switching, considering multiple transmission profiles. The method involves monitoring SINR and throughput for a UE within a base station's coverage area and dynamically switching the UE's transmission profile. This switching occurs between a two-antenna transmission profile when the SINR is above a dynamically adjustable threshold, and four-antenna transmission profile when it falls below. The adaptive threshold is adjusted based on historical throughput data and near real-time network conditions.

Referring to the drawings in general, and initially to FIG. 1, an exemplary computing environment 100 suitable for practicing embodiments of the present technology is provided. Computing environment 100 is just one example, and is not intended to suggest any limitation as to the scope of use or functionality of the embodiments discussed herein. Furthermore, the computing environment 100 should not be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus 102 that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 106 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VoIP communications. In various embodiments, the radio 116 may be configured to support multiple technologies, and/or multiple radios may be configured and utilized to support multiple technologies. The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 100. Power supply 114 may include batteries, fuel cells, and/or any other component that may act as a power source to supply power to the computing environment 100 or to other network components, including through one or more electrical connections or couplings. Power supply 114 may be configured to selectively supply power to different components independently and/or concurrently.

Figure 2:
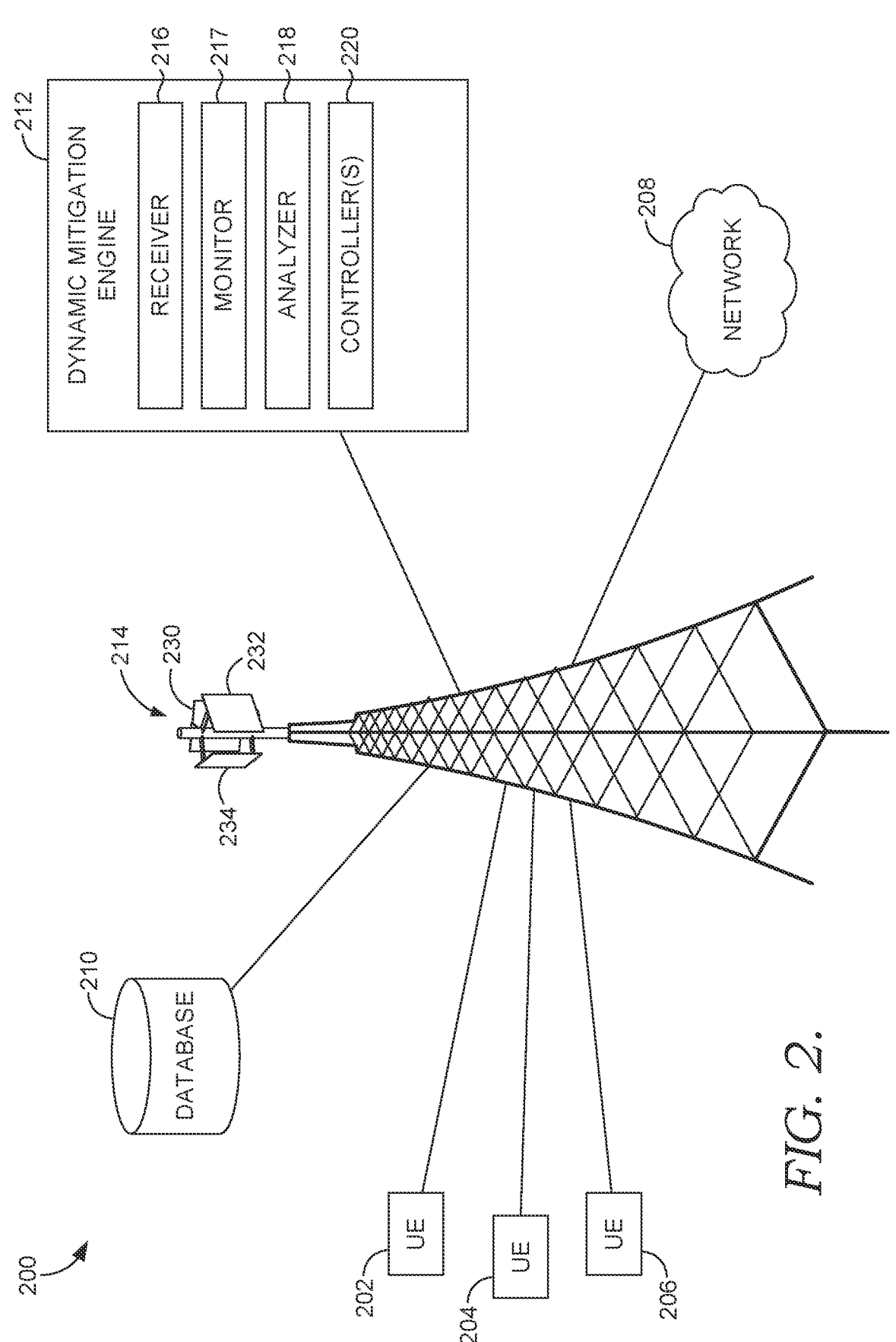
FIG. 2 illustrates a diagram of an exemplary environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic mitigation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE) to the user devices 202, 204, and 206. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited coverage area. In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. For example, the cell site may comprise a first antenna array 230, a second antenna array 232, and a third antenna array 234, wherein each of the antenna arrays serves a distinct sector (i.e., portion) of the coverage area of the cell 214. In some aspects, the cell site 214 may comprise one or more macro cells (providing wireless coverage for users within a large geographic area) or it may be a small cell (providing wireless coverage for users within a small geographic area).

As shown, cell site 214 is in communication with dynamic mitigation engine 212, which comprises various components that are utilized, in various implementations, to perform one or more methods for determining a transmission profile for a UE while the UE is within cell site 214's coverage area. In some implementations, dynamic mitigation engine 212 comprises components including a monitor 217, an analyzer 218, and a controller 220. However, in other implementations, more or less components than those shown in FIG. 2 may be utilized to carry out aspects of the invention described herein. The components of dynamic mitigation engine 212 may take any one or more of many forms, but specifically may comprise one or more processors and/or servers configured to perform the functions described herein.

The monitor 216 of the dynamic optimization engine 212 is primarily responsible for monitoring information relevant to determining the SINR and throughput for a plurality of UEs operating within the coverage area of cell site 214. The monitor 216 may receive one or more SINR parameters from either the cell site 214, various user devices, such as the user devices 202, 204, and 206, or another receiver, when located within the coverage area of cell site 214. These SINR parameters can include data such as channel failure rates, protocol data unit retransmission rates, voice call failure rates, and interference noise levels. The monitor 216 can deduce these parameters based on raw network data that is measured, observed, or otherwise acquired by cell site 214, one or more of the UEs, or any other suitable device. The monitor 216 communicates the SINR parameters to the analyzer 218 for further processing. The dynamic optimization engine 212, including monitor 216, analyzer 218, and controller 220, can seamlessly integrate with existing network management systems and other optimization tools used within the communication network, ensuring uninterrupted and coordinated operations.

The analyzer 218 is responsible for determining if the SINR falls below a dynamically adjustable pre-determined threshold based on the received SINR parameters and for identifying the optimal transmission profile for a first UE. The analyzer 218 receives the SINR parameters from the monitor 216 at an operator-defined frequency during an operator-defined sampling period. The analyzer 218 processes these parameters to determine representative values for each SINR parameter, which are then compared against historical baseline values. If a representative value falls below the pre-determined threshold value, the analyzer 218 triggers a change in the transmission profile of the UE, switching from a two-antenna transmission profile to a four-antenna transmission profile, where both transmission profiles are transmitting two data layers. As an example, the analyzer 218 may identify that the SINR values received fall below the dynamically adjustable pre-determined threshold value. In response, the analyzer 218 instructs the controller 220 to cause the UE to switch from the two-antenna transmission profile to a four-antenna transmission profile. When the UE operates with the two-antenna transmission profile, it utilizes each antenna to transmit an individual data layer. Conversely, under the four-antenna transmission profile, the UE employs pairs of antennas to concurrently transmit a singular data layer, resulting in a total of two data layers broadcasted across all four-antennas. The triggered change in transmission profile can also occur if the analyzer 218 determines that the UE is further than a pre-determined distance from the base station. For example, the analyzer 218 may determine that the UE is in a location within coverage area of the cell site 214 that exceeds a pre-determined distance from the cell site 214. Once the analyzer 218 makes this determination, the analyzer 218 instructs the controller 220 to cause the UE to switch from the two-antenna transmission profile to a four-antenna transmission profile.

The analyzer 218 can additionally determine the dynamically adjustable pre-determined threshold, with the primary goal of optimizing throughput. The analyzer 218 assesses one or more parameters such as SINR, channel state information, and interference levels, correlating these with the current user demand and network load. As an example, the analyzer 218 may identify that the existing dynamically adjustable pre-determined threshold value is set too high, leading to a reduction in throughput because UEs aren't switching to a four-antenna transmission profile soon enough. In response, the analyzer 218 adjusts the threshold value to optimize and increase throughput. For example, the threshold value may be decreased so the switch in antenna profiles will occur sooner. This pre-determined threshold is continuously monitored and fine-tuned to ensure maximum throughput. After the controller 220 implements any antenna transmission profile changes, it sends feedback to the analyzer 218 regarding the success of the implementation and any observed performance improvements. The analyzer 218 continually monitors the network, adjusting the threshold dynamically in response to any changes in network conditions, resource availability, or user demand.

The controller 220 is configured to execute the determined adjustments in transmission profiles. Upon receiving signals from the analyzer 218 indicating a requirement for profile change, the controller 220 employs embedded protocols and instruction sets to communicate the necessary adjustments to either the first UE. The instruction transmission to the UE is facilitated through secure and low-latency communication channels. The controller 220 leverages a series of command sequences and control signals, which are specifically formulated based on the nature and extent of the configuration adjustments, to instruct the targeted equipment on how to modify its transmission profile. For example, the controller 220 can receive from the analyzer 218 an instruction to change the transmission profile of a first UE from a transmission profile using two-antennas to a transmission profile using four-antennas. Once these instructions are received, the controller 220 causes the UE to switch to the four-antenna transmission profile.

Moreover, the controller 220 can implement a restoration procedure to revert the transmission profile to its original state, or the two-antenna transmission profile. This restoration can be executed either incrementally or in totality, depending on the SINR parameters being are above the pre-determined threshold. During this procedure, the controller 220 monitors the SINR levels and other relevant network metrics in real-time, determining the appropriate timing and extent of the restoration steps, based on the SINR values rising above the pre-determined threshold.

Figure 3A:
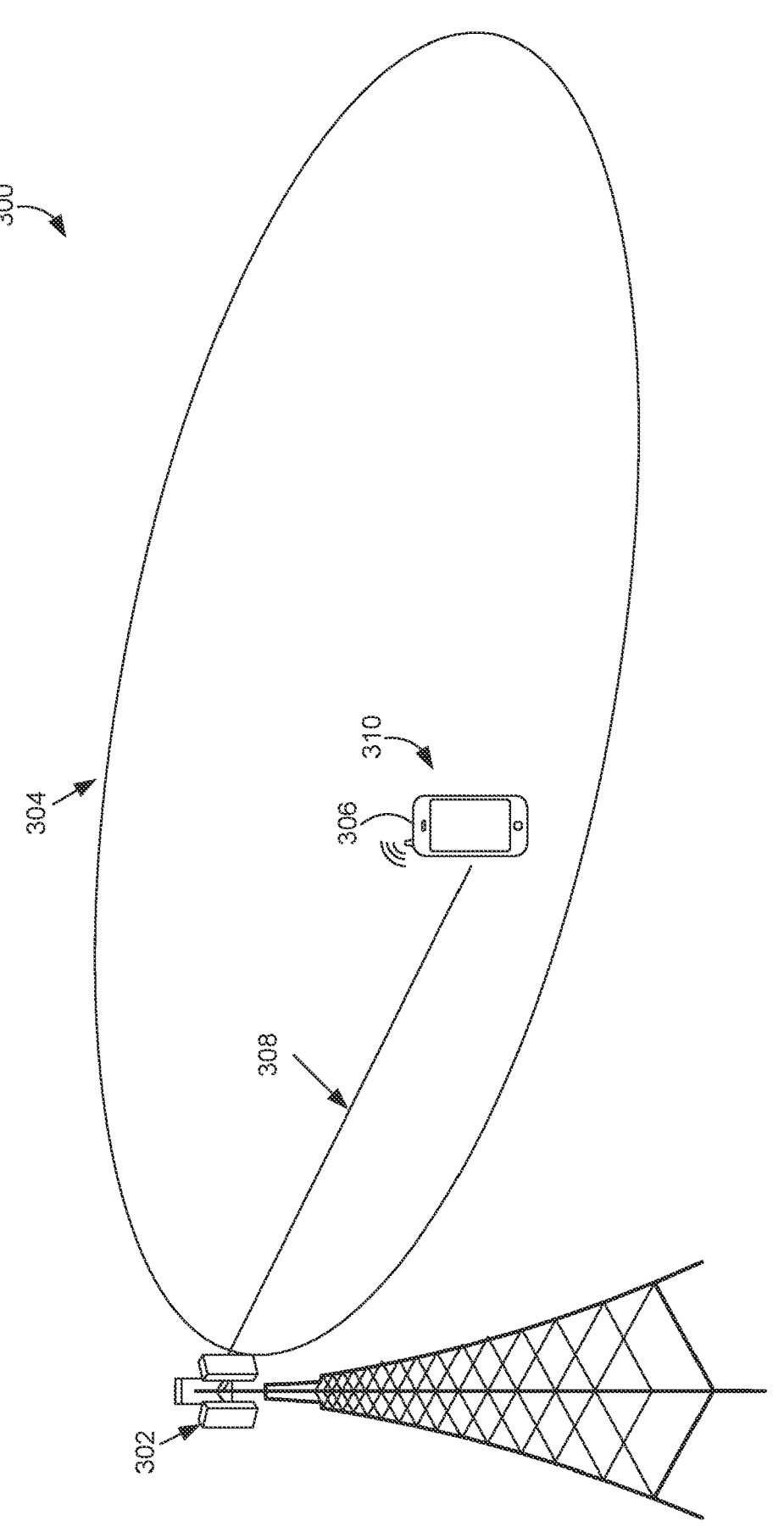
FIG. 3A, and FIG. 3B illustrate exemplary environments in which implementations of the present disclosure may be employed.

Referring now to FIG. 3A, an illustrative embodiment of the present disclosure is depicted. The depiction is centered on system 300, which fundamentally comprises cell site 302, coverage area 304, UE 306, transmission link 308, and a first location 310. The cell site 302, emblematic of a complex communication hub, hosts a dynamic optimization engine that incorporates monitor 216, analyzer 218, and controller 220. These components, working in a seamless synchronized manner, are pivotal for real-time assessment and adjustments of transmission profiles, utilizing SINR parameters and throughput measurements to achieve optimal communication efficiency.

UE 306 serves as a communicative endpoint within the system. Situated in coverage area 304, it communicates dynamically with cell site 302 through transmission link 308. The coverage area 304 in FIG. 3A represents the geographical boundary within which effective communication between UE 306 and cell site 302 is maintained. Within the constraints of coverage area 304, a first location 310 is a representation of a specific point where UE 306 could be situated. At this location, the performance metrics of the communication link, specifically SINR and throughput, are monitored. If any deviation below the dynamically adjustable pre-determined threshold is detected in SINR at this location, the system initiates immediate modulation in transmission profile from a two-antenna transmission profile to a four-antenna transmission profile.

Figure 3B:
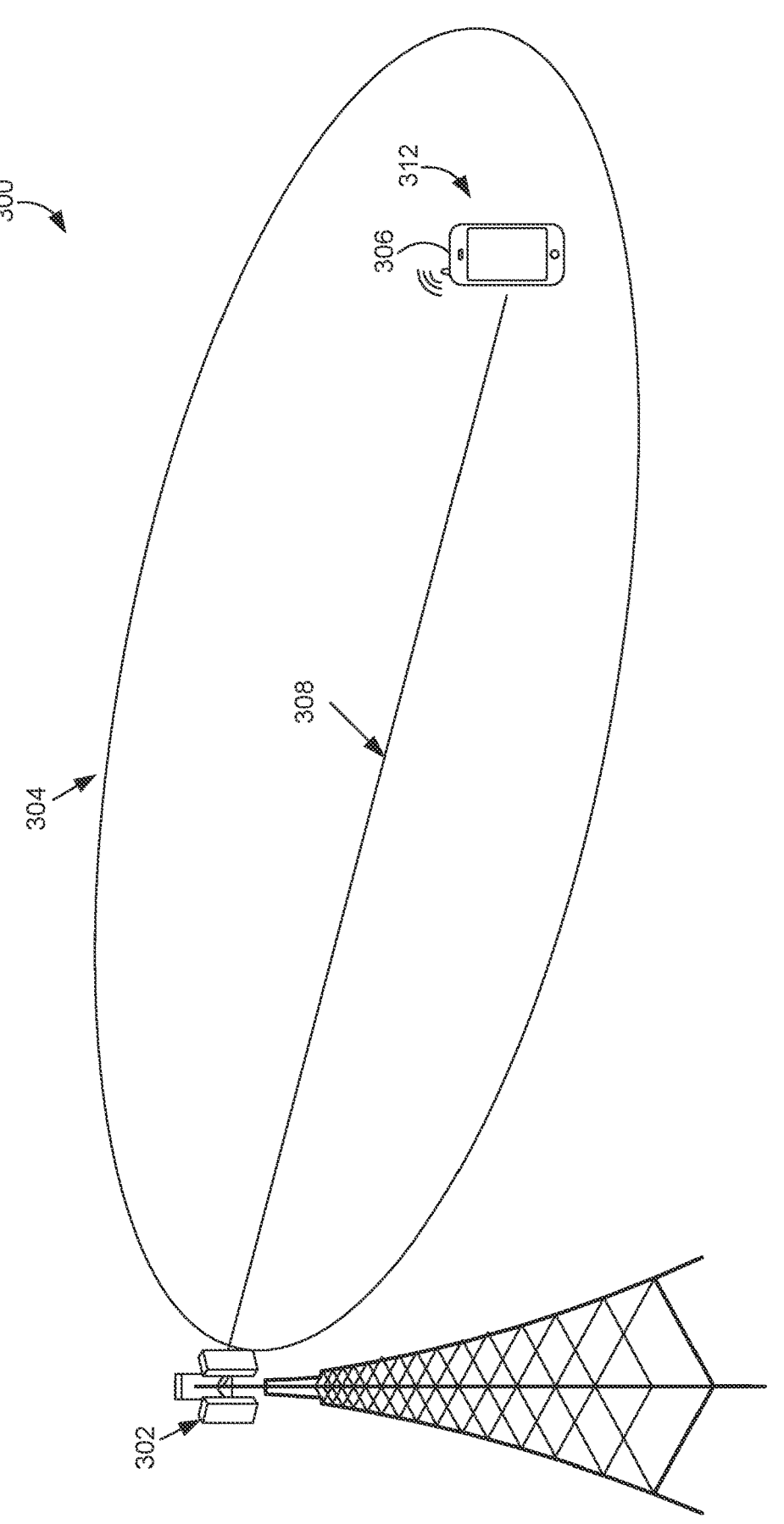

Moving now to FIG. 3B, the illustration introduces a second location 312, depicting the inherent mobility of UE 306 within the coverage area 304. The movement between the first location 310 and the second location 312 subjects UE 306 to a variety of network conditions, thus necessitating the continuous dynamic optimization of transmission profiles to preserve the integrity of communication with cell site 302. As UE 306 moves between locations, the dynamic optimization engine embedded in cell site 302 monitors the variations in SINR and throughput.

In the scenario depicted in FIG. 3B, cell site 302 continues its central role, utilizing monitor 216, analyzer 218, and optimizer 220 to process and adapt to the variations in SINR and throughput experienced by UE 306. The adaptive mechanisms within cell site 302 enable dynamic adjustments between different transmission profiles. As UE 306 relocates to second location 312, potential variations in transmission characteristics can necessitate real-time adjustments in transmission profiles. At the first location 310 within the coverage area 304, the UE 306 establishes a communication link with the cell site 302, initiating a continuous exchange of data through transmission link 308. The monitor 216, embedded within the dynamic optimization engine at cell site 302, plays a pivotal role in tracking the SINR and UE 306 location in real-time as UE 306 interacts with the network.

As UE 306 relocates and progresses towards the second location 312, the movement induces variations in SINR due to changes in geographical and environmental conditions, network congestion, and interference levels. The monitor 216 observes these fluctuations in the SINR values and the location of the UE 306. When the monitored SINR falls below the dynamically adjusted pre-determined threshold or the UE 306 exceeds a threshold distance from the cell site 302, the analyzer 218 determines that the UE 306 must switch from the two-antenna transmission profile to a four-antenna transmission profile. Following the determination, the controller 220 receives instructions regarding the necessary adjustments in transmission profile. It translates these instructions into actionable commands, which are subsequently relayed to the UE 306. The UE 306 then switches between different antenna profiles, such as from a two-antenna transmission profile to a four-antenna transmission profile, based on the SINR and the location.

Turning now to FIG. 4, a flow chart representing a method 400 is provided. FIG. 4 presents a detailed flowchart representing the sequence of operations undertaken by the innovative system. Initially, at block 402, the system engages in determining that a first UE is configured to operate within a coverage area of a base station utilizing a two-antenna transmission profile. This serves as the foundational step, establishing the initial configuration of the UE for communication within the base station's range.

Following the establishment of the UE's operational configuration, the system proceeds to block 404. Here, it embarks on monitoring the SINR and throughput for the first UE. This step involves the continuous assessment of the communication quality and the efficiency of the data transfer between the UE and the base station. The monitoring of these parameters is vital to ascertain whether the current antenna transmission profile is optimal for the prevailing network conditions. Upon monitoring the SINR and throughput, the system advances to block 406, where it determines whether the SINR has fallen below a pre-determined threshold. If the SINR is observed to be below the set threshold, it signifies that the current transmission profile may not be optimal, thus necessitating a reconfiguration to maintain high-quality communication. It should be noted that the base station is capable of communicating with multiple UEs simultaneously, with each UE's transmission profile being adjusted independently based on its SINR and throughput.

After monitoring the SINR and throughput, the system advances to block 406, where it determines whether the SINR has fallen below a pre-determined threshold. This step is pivotal as it acts as a decision-making point in the process. If the SINR is observed to be below the set threshold, it signifies that the current transmission profile may not be optimal. In such a scenario, as outlined in block 408, the system configures the first UE to operate within the coverage area of the base station using four-antenna transmission profile instead of the initial two-antenna transmission profile. Conversely, if the SINR rises above the threshold, the system reverts the first UE to operate with the initial two transmission antennas. This adjustment in configuration, particularly when shifting to four-antennas, employs beamforming techniques to enhance the directional focus of the transmitted signal towards the base station. Upon any transmission profile change, the user of the first UE is notified, providing them insights into the signal quality and current connectivity status. Furthermore, it should be noted that the base station is capable of communicating with multiple UEs simultaneously, with each UE's transmission profile being adjusted independently based on its SINR and throughput. This adjustment is aimed at enhancing the communication link between the UE and the base station, thereby improving both the signal quality and the data throughput under the given network conditions, according to any one or more aspects described with respect to FIGS. 2-4.

Turning now to FIG. 5, a flow chart representing a method 500 is provided. FIG. 5 presents a detailed flowchart representing the sequence of operations undertaken by the innovative system. FIG. 5 offers an in-depth view of a systematic approach, shedding light on the mechanisms employed to ensure optimal communication within a network. The depicted process begins with block 502, where the system is actively engaged in monitoring a SINR and throughput for a first UE operating within the coverage area of a base station. Simultaneously, the corresponding base station dynamically adapts its transmission parameters, including power levels and modulation schemes, ensuring synchronization with the UE's transmission profile changes for maintaining optimal communication links. The system also employs predictive analytics to forecast if the SINR will exceed the pre-determined threshold in the near future. This step is foundational, providing real-time insights into the quality and efficiency of the communication link between the UE and the base station.

After collecting real-time data, the system progresses to block 504. In this phase, a dynamic approach is adopted to optimize the transmission profile of the first UE. The system is capable of switching between a two-antenna transmission profile when the SINR is above a dynamically adjustable pre-determined threshold and a four-antenna transmission profile when the SINR falls below this threshold. Concurrently, adaptive modulation and coding schemes are utilized in conjunction with the dynamic antenna switching to optimize the communication link. This dynamic adaptability is a key feature, allowing the system to respond to variations in network conditions, thereby ensuring a stable and high-quality communication link. The decision to switch between the two and four transmission profiles is governed by a control algorithm. This algorithm evaluates trade-offs, such as increasing data rates, improved signal quality, energy consumption, and system overhead, ensuring optimal real-time decisions.

Block 506 introduces another layer of adaptability and intelligence to the system. Here, the dynamically adjustable pre-determined threshold, which serves as the benchmark for switching transmission profiles, is not static. Instead, it is adjusted based on historical throughput measurements and near real-time network conditions. This means that the system is not only reacting to current conditions but is also learning and adapting based on past data, enhancing its predictive capabilities and ensuring more nuanced and informed adjustments. This adjustment is facilitated by employing machine learning algorithms which analyze both historical and real-time data, enhancing the system's adaptability. When adjusting the dynamically adjustable pre-determined threshold, the system takes into account user mobility, variations in network traffic, and prevailing environmental conditions to ensure optimal transmission profile. The switching decisions between different transmission profiles are also influenced by parameters such as latency, data rate requirements, and the battery life of the first UE. The adjustment of this dynamically adjustable pre-determined threshold also considers geographic location-specific data, enhancing the system's sensitivity to location-based network variations. Furthermore, the dynamically adjustable pre-determined threshold undergoes time-of-day based adjustments to cater to varying network demands during different periods.

This approach in FIG. 5 allows for a harmonious balance between proactivity and reactivity. The system is proactive, as it constantly monitors the SINR and throughput, anticipating the need for adjustments. It is also reactive, capable of swiftly switching transmission profiles and adjusting thresholds in response to the ever-changing network environment. Should the SINR rise above the dynamically adjustable pre-determined threshold, the system would revert back to the two-antenna transmission profile for optimal performance.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for dynamic optimization of antenna transmission profile switching comprising:
    determining that a user equipment (UE) is operating within a coverage area of a base station using a two-antenna transmission profile;
    monitoring a signal to interference plus noise ratio (SINR) and a throughput for the UE;
    determining, that the SINR falls below a pre-determined threshold; and
    based on the SINR falling below the pre-determined threshold, causing the UE to operate within the coverage area of the base station using a four-antenna transmission profile.

2. The method of claim 1, further comprising dynamically adjusting the pre-determined threshold based on historical throughput measurements.

3. The method of claim 2, further comprising using real-time network data for dynamically adjusting the pre-determined threshold.

4. The method of claim 1, further comprising reverting the UE to operate with the two-antenna transmission profile when the SINR is determined to be above the pre-determined threshold.

5. The method of claim 1, wherein the base station is configured to communicate with multiple UEs simultaneously, and the method is applied independently to each UE based on the SINR of each UE.

6. The method of claim 1, further comprising predicting that the SINR will exceed the pre-determined threshold at a future time.

7. The method of claim 6, further comprising, causing the UE to switch to a four-antenna transmission profile at the future time.

8. The method of claim 1, further comprising notifying a user of the UE of a transmission profile and providing information regarding signal quality and connectivity status.

9. A method for dynamic optimization of antenna transmission profile switching comprising:
    monitoring a network parameter within a coverage area of a base station;
    dynamically switching a transmission profile of the UE between:
        a two-antenna transmission profile when the network parameter is above a dynamically adjustable pre-determined threshold; and
        a four-antenna transmission profile when the network parameter falls below the dynamically adjustable pre-determined threshold;
    adjusting the dynamically adjustable pre-determined threshold based on historical throughput measurements and near real-time network conditions.

10. The method of claim 9, wherein the network parameter is distance from the base station to the UE.

11. The method of claim 9, wherein the network parameter is a signal to interference plus noise ratio (SINR).

12. The method of claim 11, further comprising notifying a user of the UE of the transmission profile and providing information regarding signal quality and connectivity status.

13. The method of claim 11, wherein the adjusting the dynamically adjustable pre-determined threshold is based in part on geographic location-specific data.

14. The method of claim 11, wherein the historical throughput measurements include data from multiple UEs operating within the coverage area of the base station.

15. The method of claim 11, wherein the dynamically adjustable pre-determined threshold is adjusted based on a time-of-day schedule.

16. One or more non-transitory computer-readable media having computer-executable instructions embodied thereon that, when executed, perform a method for dynamic optimization of antenna transmission profile switching, the method comprising:
    monitoring a signal to interference plus noise ratio (SINR) and a throughput for a UE operating within a coverage area of a base station;
    dynamically switching a transmission profile of the UE between: a two-antenna transmission profile when the SINR is above a dynamically adjustable pre-determined threshold; and a four-antenna transmission profile when the SINR falls below the dynamically adjustable pre-determined threshold; adjusting the dynamically adjustable pre-determined threshold based on historical throughput measurements and near real-time network conditions.

17. The method of claim 16, further comprising switching the transmission profile of the UE back to the two-antenna transmission profile from the four-antenna transmission profile when the SINR rises above the dynamically adjustable pre-determined threshold.

18. The method of claim 16, wherein adjusting the dynamically adjustable pre-determined threshold is based in part on account user mobility, variations in network traffic, and environmental conditions.

19. The method of claim 16, further comprising predicting that the SINR will exceed the pre-determined threshold at a future time and causing the UE to switch to a four-antenna transmission profile at the future time.

20. The method of claim 16, wherein a base station corresponding with the UE is configured to adapt its transmission parameters, including power levels and modulation schemes, in synchronization with the changes in the transmission profile of the UE.

* * * * *